United States Patent
Luppi

(10) Patent No.: US 8,172,481 B2
(45) Date of Patent: May 8, 2012

(54) METHOD OF INSTALLING A TUBULAR UNDERSEA PIPELINE

(75) Inventor: Ange Luppi, Nîmes (FR)

(73) Assignee: Technip France (FR)

( * ) Notice: Subject to any disclaimer, the term of this patent is extended or adjusted under 35 U.S.C. 154(b) by 231 days.

(21) Appl. No.: 12/681,005

(22) PCT Filed: Sep. 17, 2008

(86) PCT No.: PCT/FR2008/001299
§ 371 (c)(1),
(2), (4) Date: Mar. 31, 2010

(87) PCT Pub. No.: WO2009/071762
PCT Pub. Date: Jun. 11, 2009

(65) Prior Publication Data
US 2010/0209197 A1    Aug. 19, 2010

(30) Foreign Application Priority Data

Oct. 3, 2007 (FR) ..................... 07 06947

(51) Int. Cl.
*F16L 1/14* (2006.01)
(52) U.S. Cl. ............ 405/171; 405/166; 405/169; 441/4; 166/350
(58) Field of Classification Search ............ 405/158, 405/166, 168.1, 168.3, 169, 170, 171; 441/4; 166/350, 367
See application file for complete search history.

(56) References Cited

U.S. PATENT DOCUMENTS

| 4,367,055 | A | * | 1/1983 | Gentry et al. | 405/169 |
| 4,400,109 | A | * | 8/1983 | Gentry et al. | 405/169 |
| 4,400,110 | A | * | 8/1983 | Beynet et al. | 405/170 |
| 4,493,590 | A | * | 1/1985 | Ayers et al. | 405/170 |
| 4,793,737 | A | * | 12/1988 | Shotbolt | 405/169 |
| 4,848,949 | A | * | 7/1989 | Castel | 405/169 |
| 4,906,137 | A | * | 3/1990 | Maloberti et al. | 405/170 |
| 5,505,560 | A | * | 4/1996 | Brown et al. | 405/169 |
| 7,934,560 | B2 | * | 5/2011 | Roveri et al. | 405/224.2 |
| 2004/0218981 | A1 | * | 11/2004 | Chenin | 405/169 |
| 2008/0056826 | A1 | * | 3/2008 | Luppi | 405/171 |
| 2008/0253842 | A1 | * | 10/2008 | Wolbers et al. | 405/169 |
| 2010/0018717 | A1 | * | 1/2010 | Espinasse et al. | 405/169 |
| 2010/0166500 | A1 | * | 7/2010 | Roveri et al. | 405/169 |

FOREIGN PATENT DOCUMENTS

| FR | 2 809 136 A | 11/2001 |
| GB | 2 371 065 A | 7/2002 |
| WO | WO 2006/120351 A | 11/2006 |

OTHER PUBLICATIONS

International Search Report dated Jul. 1, 2009, issued in corresponding international application No. PCT/FR2008/001299.

* cited by examiner

*Primary Examiner* — Frederick L Lagman
(74) *Attorney, Agent, or Firm* — Ostrolenk Faber LLP

(57) ABSTRACT

An undersea installation for transporting hydrocarbons between a seabed and a surface and to a method for installing same. The installation includes a tubular undersea pipeline, a float and a coupling device. The undersea pipeline has a rising part, a connecting part and an intermediate portion. The coupling device includes a first longitudinal part and a second part connected in a coupling region of the first part. The coupling region of the first longitudinal part and the float being configured to be connected together. The first part is configured to pivot about the coupling region while bending the intermediate portion when the rising part is unwound and tilts towards the seabed.

14 Claims, 4 Drawing Sheets

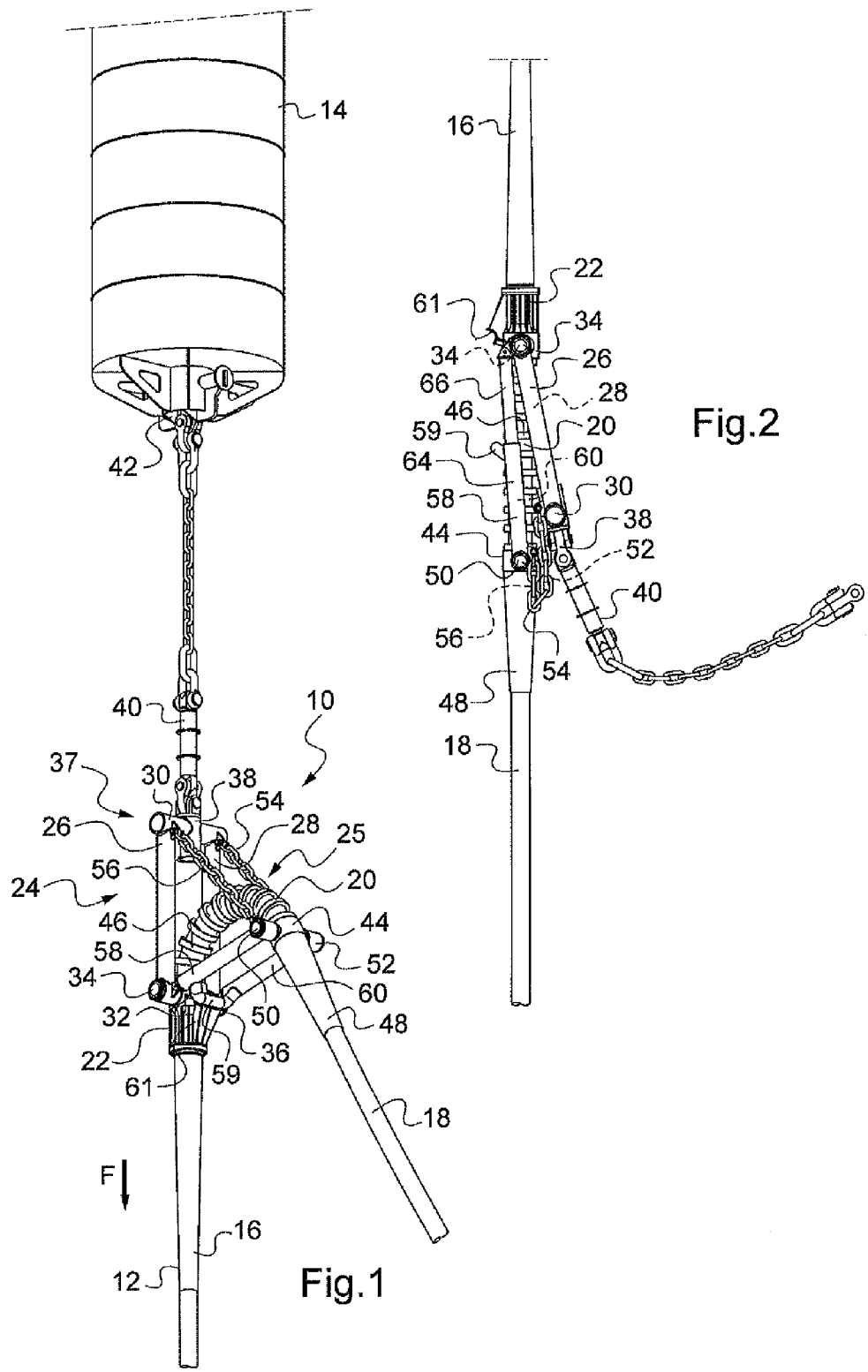

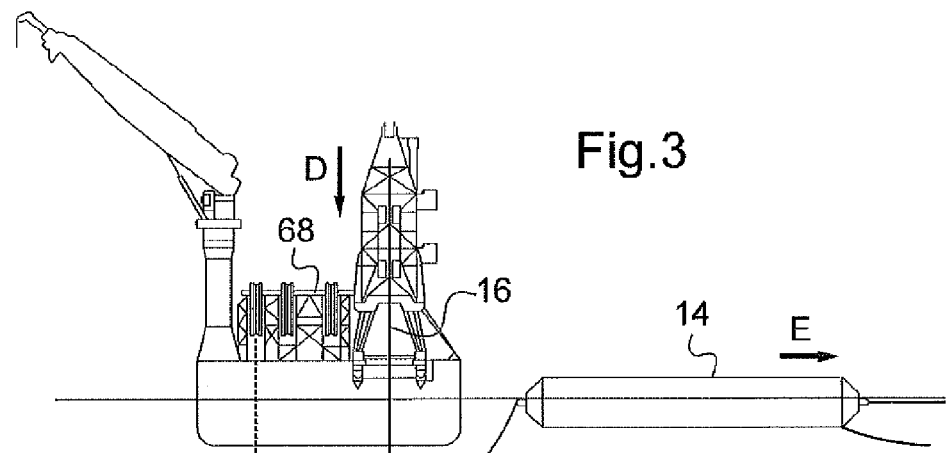
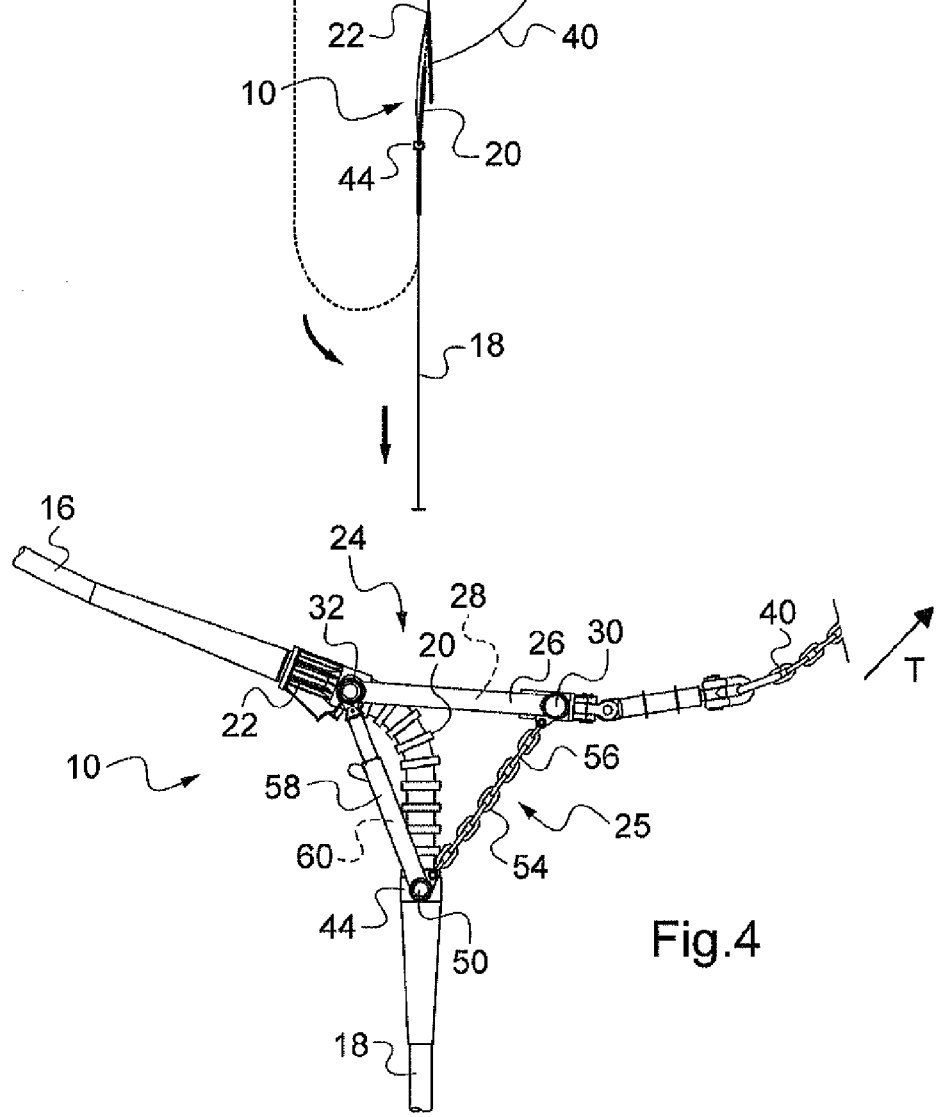

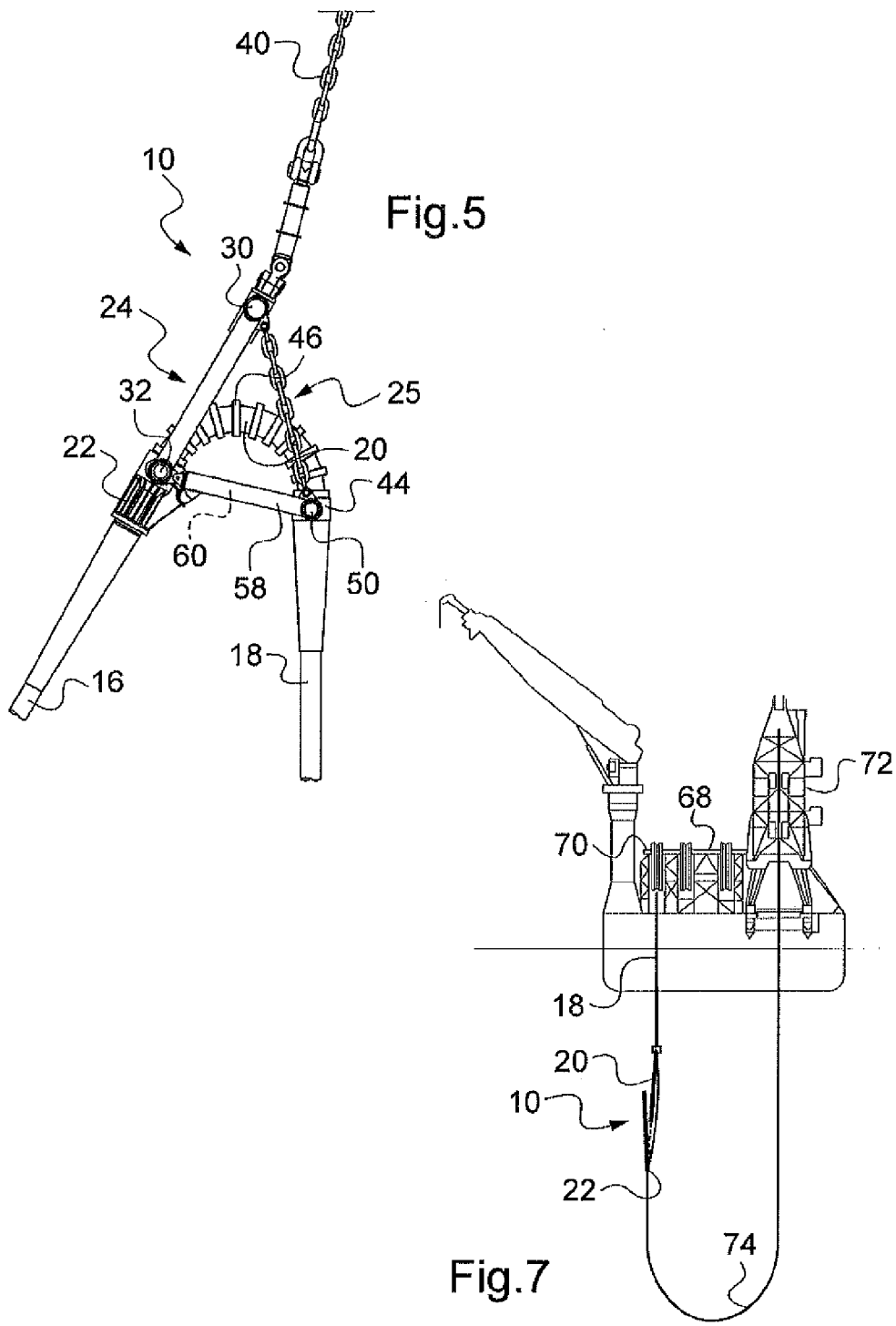

METHOD OF INSTALLING A TUBULAR UNDERSEA PIPELINE

CROSS REFERENCE TO RELATED APPLICATION

The present application is a 35 U.S.C. §§371 national phase conversion of PCT/FR2008/001299, filed 17 Sep. 2008, which claims priority of French Application No. 0706947, filed 3 Oct. 2007, the disclosure of which is incorporated by reference herein. The PCT International Application was published in the French language.

BACKGROUND OF THE INVENTION

The present invention relates to a method of installing a tubular undersea pipeline and to the corresponding undersea installation, making it possible to transport hydrocarbons between a seabed and a surface.

The exploitation of undersea oil fields requires specific installations, which are relatively complex to implement. What is particular to the marine environment is that it has a bottom covered by a greater or lesser height of water delimited by a surface and that it is not possible to maneuver freely therein. In addition, it is generally necessary to use controlled robots to install the various elements of the installations between the bottom and the surface.

These installations usually comprise a flexible or else rigid tubular undersea pipeline and a float designed to float in the vicinity of said surface in order to maintain the pipeline in suspension in the water via a coupling device. The undersea pipeline has a rising part, which extends from the seabed up to a position close to the surface below a relatively agitated region; a connecting part which makes it possible to connect the rising pipeline to surface installations designed to store a hydrocarbon; and an intermediate portion curved in a swan's neck between the substantially vertical rising part and the connecting part which extends in the form of a catenary up to the surface. The coupling device additionally makes it possible to couple together said rising part and said connecting part in suspension and to maintain said intermediate portion curved in a swan's neck between said rising part and said connecting part. Said curved intermediate portion is generally rigid and is thus generally installed in a reception frame. Reference may be made in particular to document FR 2 809 136, which describes such an installation.

This type of installation must be at least partly installed beneath the surface and in particular below the agitated region. This is because it is impossible for the tubular pipeline equipped with the coupling device to be unwound from a surface vessel and through its working well, since it is much too bulky. Thus, the rising part is first of all unwound and then maintained in suspension in the water; then the coupling device is coupled thereto in order to connect the buoy and the rising pipeline, after which the connecting part is attached by guiding it from the surface. These operations are relatively long and therefore the installation costs are high.

A problem which is then posed and which the present invention aims to solve is to provide a more economic installation method which makes it possible to install the pipeline more rapidly and with the customary means.

SUMMARY OF THE INVENTION

In the aim of solving this problem, the present invention proposes, according to a first aspect, a method of installing a tubular undersea pipeline for transporting hydrocarbons between a seabed and a surface, said tubular undersea pipeline having a rising part, a surface connecting part and an intermediate portion between said rising part and said connecting part, said method being of the type in which there is provided a float designed to float in the vicinity of said surface in order to couple together said rising part and said connecting part in suspension so as to maintain said intermediate portion curved in a swan's neck between said rising part and said connecting part, according to the invention it comprises the following steps: said tubular undersea pipeline is stored on a vessel floating on said surface; a deformable coupling device is provided to connect together said rising part and said connecting part substantially parallel to said intermediate portion, said device comprising a first longitudinal part and a second part connected in a coupling region of said first part by a pivoting link; said float and said coupling region of said first longitudinal part are connected, while said intermediate portion and said coupling device hanging from said rising part are submerged; and, finally, said rising part is unwound toward said seabed such that said connecting part is retained by said float via said second part, and such that said rising part tilts toward said seabed by driving, in a pivoting motion about said coupling region, said first part while curving said intermediate portion, said rising part being retained suspended from said float via said first part.

Thus, a feature of the invention lies in the use of a deformable coupling device capable of being installed folded along the tubular pipeline, and which therefore can be unwound from the surface vessel via a guide system so as to be deployed subsequently when it is in the water. Hence, the tubular pipeline can be installed rapidly from the surface vessel. In particular, the intermediate pipeline portion, which is now flexible unlike the one described in the prior art, can be installed initially between the connecting part and the rising part in the continuation thereof. It is only subsequently, once in the water, that the intermediate part is curved to form a swan's neck. In order to prevent this flexible intermediate part from folding when the second part pivots, which would damage the pipeline, said two parts of the coupling device are advantageously maintained inclined with respect to one another in a fixed position. Thus, said curved intermediate portion is maintained along a radius of curvature greater than a limit radius of curvature. This radius of curvature will then be determined precisely by the inclination of the two parts of the coupling device with respect to one another. Furthermore, either in a complementary manner or else by way of substitution, segments of said intermediate portion are defined, and the pivoting of said segments with respect to one another is limited so as to limit the radius of curvature of said intermediate portion.

According to a particular embodiment of the invention, said connecting part connected to said intermediate portion is stored on one side of said surface vessel and said free rising part is stored on another side. As will be explained below in a more detailed manner, the connecting part and the intermediate portion form a single piece, and the rising part forms another piece. The latter is generally more rigid than the preceding two. Hence, they are wound differently on the surface vessel and at different points. Thus, in a preferred manner, said intermediate portion and said first longitudinal part are coupled together to a traction line which extends in a loop below the surface vessel between the two aforementioned sides, while said second part and said intermediate portion are coupled together and suspended from said connecting part; and said connecting part is unwound from said one side while said traction line is wound up from said other side, thereby forming a loop below said surface vessel so as to connect said intermediate portion and said first longitudinal part coupled together to said rising part, on said surface vessel.

Furthermore, during the installation, said float is separated from said surface vessel after having connected said float to said coupling region of said first longitudinal part and submerged said intermediate portion and said deformable coupling device, so as to extend said rising part and said first part in the form of a catenary. Consequently, the pivoting of the first longitudinal part of the coupling device starts when the float is separated and then takes place progressively when the rising pipeline is unwound.

Finally, said rising part is drawn toward said seabed after having completely unwound said rising part which has then joined the seabed, so as to drive said float below said surface in order to align and maintain substantially vertically in tension said rising part and said first part. Thus, with the first part being oriented substantially vertically the second part of the coupling device is inclined with respect to the vertical and retains the connecting part and therefore the intermediate pipeline portion in its minimum position of curvature.

According to a second aspect, the present invention proposes an undersea installation for transporting hydrocarbons between a seabed and a surface, comprising a tubular undersea pipeline, a float designed to float in the vicinity of said surface and a coupling device for coupling said pipeline to said float, said tubular undersea pipeline having a rising part, a surface connecting part and an intermediate portion between said rising part and said connecting part, said coupling device making it possible to couple together said rising part and said connecting part in suspension and to maintain said intermediate portion curved in a swan's neck between said rising part and said connecting part; according to the invention, said coupling device comprises a first longitudinal part and a second part connected in a coupling region of said first part by a pivoting link, so as to connect together said rising part and said connecting part substantially parallel to said intermediate portion, said coupling region of said first longitudinal part and said float being designed to be connected together; and said first part is designed to pivot about said coupling region while curving said intermediate portion in a swan's neck when said rising part is unwound and tilts toward said seabed, whereas said connecting part is retained by said float via said second part and said rising part is retained suspended from said float via said first part. The first longitudinal part is then connected to the rising part, while the second part is connected for its part to the connecting part of the pipeline.

Advantageously, according to a particular embodiment, said first longitudinal part comprises two substantially parallel uprights and two mutually opposed spacers for maintaining said uprights spaced from one another in a rigid manner, a first spacer being intended to receive said rising part and a second spacer defining said coupling region, whereas said intermediate pipeline part is able to extend freely between said uprights so as to be able to be curved freely during the pivoting of the first part of the coupling device.

Furthermore, said second part advantageously comprises two flexible links mounted on said second spacer respectively in line with said uprights so as to allow the movement of the intermediate pipeline portion between the two links during the tilting of the rising part. Moreover, the two links provide a symmetry in the take-up of the forces which are then exerted between the connecting part and the float.

Specifically, and with the aim of respecting this symmetry in the take-up of the forces, said second part additionally comprises a retaining ring able to receive said connecting part, said retaining ring having two projecting diametrically opposed half-shafts, said two flexible links respectively being connected to the two half-shafts.

Moreover, said coupling device additionally comprises, and in a preferred manner, a locking arm for maintaining said two parts of the coupling device inclined with respect to one another in a fixed position so as to maintain said intermediate pipeline portion curved along a radius of curvature greater than a limit radius of curvature. According to a particular embodiment, said locking arm is telescopic, in order to be capable of running alongside said extended intermediate portion in a drawn position of said arm. Consequently, when the first part of the coupling device pivots, the telescopic arm is shortened to a defined length which conditions the radius of curvature of the intermediate pipeline portion once the pipeline is installed. Furthermore, and according to a preferred embodiment, the coupling device is equipped with two parallel telescopic arms which are respectively mounted on a first spacer and on the half-shafts. The two telescopic locking arms are then spaced from one another so as to allow the passage of the intermediate pipeline portion during the pivoting of the first part of the coupling device.

Moreover, said intermediate portion, which is advantageously the continuation of the connecting part, is housed inside a vertebra sheath so as to limit the radius of curvature of said intermediate portion when it is curved.

Other particular features and advantages of the invention will become apparent on reading the description which follows a particular embodiment of the invention given by way of nonlimiting illustration with reference to the appended drawings, in which:

BRIEF DESCRIPTION OF THE DRAWINGS

FIG. 1 is a partial schematic perspective view showing an element of an undersea installation according to the invention in a deployed position;

FIG. 2 is a partial schematic side view showing the element illustrated in FIG. 1 in a folded position;

FIG. 3 is a schematic overall view showing the element represented in FIG. 2 in a folded position and other elements of the undersea installation;

FIG. 4 is a schematic view of the element represented in FIG. 2 in a first partial deployment position;

FIG. 5 is a schematic view of the element represented in FIG. 4 in a second partial deployment position;

FIG. 7 is a schematic overall view in an installation phase prior to the installation phase illustrated in FIG. 3, and according to a particular installation mode.

DESCRIPTION OF A PREFERRED EMBODIMENT

Figure 6:
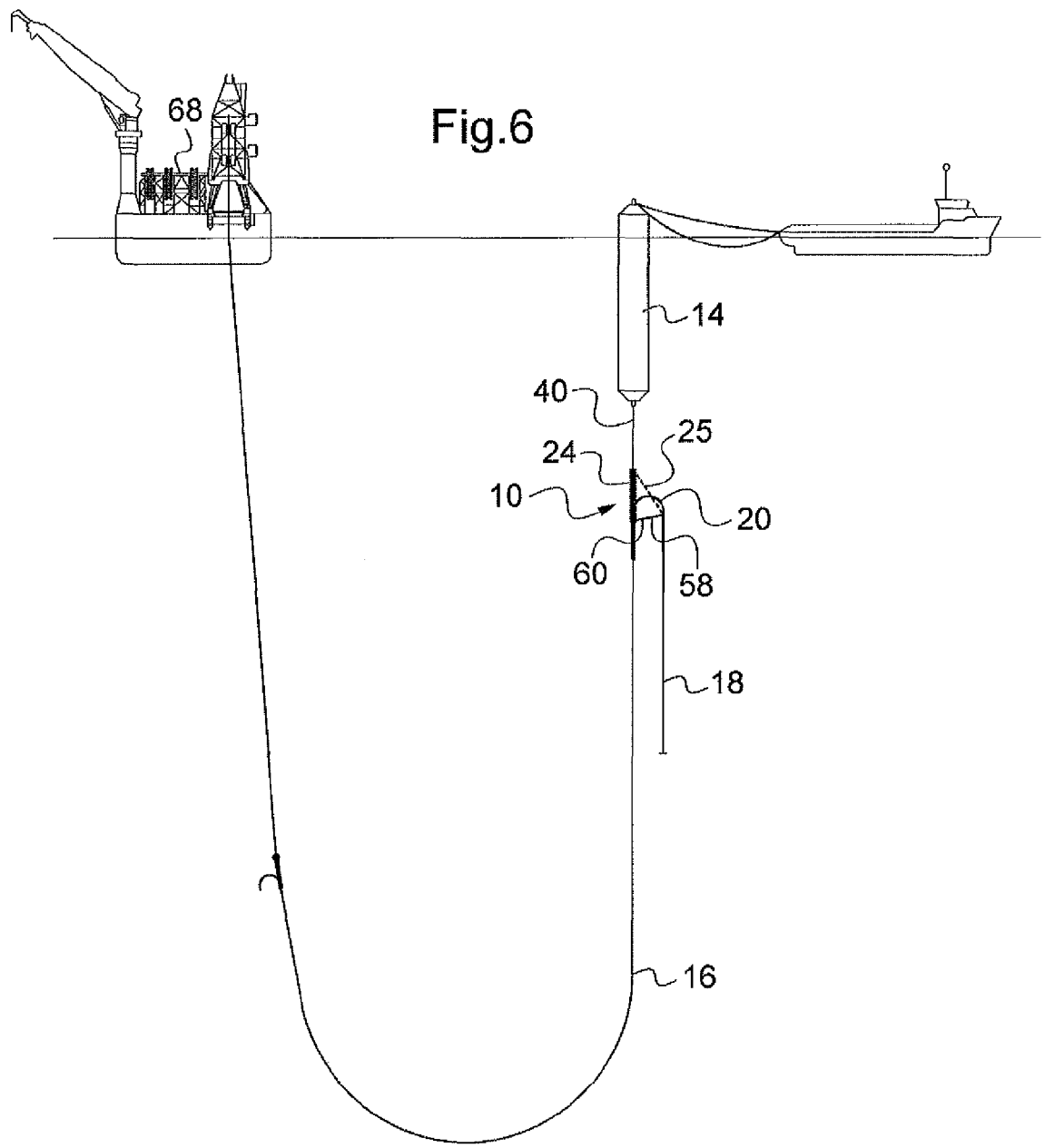
FIG. 6 is a schematic overall view showing the element represented in FIG. 1 in the deployed position and other elements of the undersea installation.

FIG. 1 illustrates a coupling device 10 according to the invention and in a deployed position in a marine environment between a seabed and a surface. This coupling device 10 will be described first of all in detail in a position of equilibrium and deployed in order then to describe more precisely its mode of installation.

This coupling device 10 makes it possible to suspend a tubular undersea pipeline 12, which is in this case flexible, from a float 14. Furthermore, the coupling device 10 maintains together three parts of the pipeline, namely a rising part 16 which extends substantially vertically to join the seabed, a connecting part 18 which extends in the form of catenaries to join the surface and an intermediate portion 20 curved in a swan's neck, which forms the junction between the rising part 16 and the connecting part 18. The rising part 16 is connected to a connection sleeve 22 to which an end of the intermediate portion 20 is itself connected. It will be observed that the rising pipeline part 16 is, according to the embodiment described here, flexible, but that a rigid rising part is equally suitable.

The coupling device 10 comprises a first longitudinal part 24 and a second part 25. The first longitudinal part 24 has two parallel uprights 26, 28 interconnected at their ends by two opposed spacers 30, 32. Thus, the two uprights 26, 28 and the two opposed spacers 30, 32 form a rectangular rigid frame having a length between five meters and twenty meters, for example ten meters and a width between one meter and six meters, for example three meters. A first spacer 32 is connected to the rising part 16 via the connection sleeve 22. The latter, which allows the connection of the rising part 16 and the intermediate portion 20, has two first half-shafts 34, 36 which project from the connection sleeve 22 in diametrically opposed directions. The first spacer 32 thus consists of the connection sleeve 22 and the two half-shafts which form only a single piece. The uprights 26, 28 are thus mounted in rotation respectively on these two half-shafts 34, 36. It will be observed furthermore that the intermediate portion 20 can freely extend between the uprights 26, 28. At the opposite end of the first longitudinal part 24 a second spacer 30, connecting the two uprights 26, 28 in a rigid manner and defining a coupling region 37, has a coupling member 38 which extends perpendicularly to the second spacer 30 substantially between the uprights 26, 28 and in an opposite direction. This coupling member 38 is itself connected to a line 40 coupled in one end 42 of the float 14. Thus, the load of the rising part 16 which tends to exert a force F directed toward the bottom is taken up by the float 14 via the first longitudinal part 24 and the line 40.

Before describing in detail the second part 25 of the coupling device 10, the intermediate portion 20 and the connecting part 18, which here forms in fact only one and the same pipe, will be described. Specifically, the intermediate portion 20 is delimited from the connecting part 18 by a ring 44 which encloses the pipeline. The pipeline is then, in the intermediate portion 20 between the connection sleeve 22 and the ring 44, equipped with a well-known vertebra sheath 46 which makes it possible to limit the radius of curvature of the intermediate portion 20 above a limit radius of curvature, whereas toward the connecting portion 18, the pipeline is equipped with a stiffener sleeve 48, for example made of polyurethane, which makes it possible to impart a bending resistance to the connecting part 18 in the vicinity of the ring 44. The ring 44 is then also secured both to the stiffener sleeve 48 and to the vertebra sheath 46. Furthermore, the ring 44 has two second half-shafts 50, 52 which project from the ring 44 in diametrically opposed directions.

Thus, the second part 25 of the coupling device 10 comprises two flexible links 54, 56 consisting of chains having a length close to the length of said uprights 26, 28 and connecting in a parallel manner and respectively the second spacer 30 and the two second half-shafts 50, 52. These flexible links 54, 56 are coupled on the second spacer 30, respectively in line with the uprights 26, 28. They are here extended and form respectively an angle with the uprights 26, 28, between 50 and 70°, for example 60°. These two flexible links 54, 56 make it possible to retain the connecting part 18 in traction.

Moreover, the ring 44 is maintained at a distance from the first spacer 32 via locking arms 58, 60 connecting in parallel and respectively the first half-shafts 34, 36 of the connection sleeve 22 and the second half-shafts 50, 52 of the ring 44. As will be described below, the locking arms 58, 60 are telescopic and are here locked in their retracted position. For this purpose, the locking arms 58, 60 are connected together by an arcuate connection piece 59 butting against a reception part 61 formed on the connection sleeve 22. Consequently, the traction directed toward the bottom at the ring 44 by the connecting part 18 which is extended in the form of a catenary is for its part taken up by the flexible links 54, 56, and also by the locking arms 58, 60 which work in compression, with the result that the intermediate pipeline portion 20 is maintained in its position in the form of a swan's neck without its radius of curvature being able to decrease.

It will be observed that the locking arms 58, 60 in their retracted position have a length close to that of the uprights 26, 28 and that they thus define two substantially isosceles triangles with the extended flexible links 54, 56 and the uprights 26, 28.

The coupling device 10 according to the invention, apart from the fact that it makes it possible to suspend the flexible pipeline from a float 14 while maintaining the intermediate portion 20 curved in a swan's neck, is original in that it can be folded and deployed during the installation of the undersea pipeline.

Thus, FIG. 2 illustrates the coupling device 10 in a folded position and suspended from the rising part 16 which is, as will be explained below, unwound from the surface vessel. It will be observed that the intermediate portion 20 extends longitudinally in the continuation of the rising part 16. The coupling device 10 is in a position shifted by 180° with respect to the position which it has in FIG. 1. We thus find again the connection sleeve 22 on which the uprights 26, 28 are pivotally mounted about the first half-shafts 34, 36 respectively, and the intermediate portion 20 equipped with its vertebra sheath 46 and which retains the connecting part 18 within its continuation. The flexible links 54, 56 are thus folded on themselves, since the intermediate portion 20 extends longitudinally substantially between the uprights 26, 28 of the first part 24 and, therefore, the two second half-shafts 50, 52 and the second spacer 30, where precisely the flexible links 54, 56 are respectively attached, are closer together in this position. We also find again the telescopic locking arms 58, 60 in an extended position in which two elements 64, 66 slideably engaged in one another appear. They thus appear more clearly, on the one hand, the connection piece which connects only the element 64 of the two arms in which the element 66 engages and, on the other hand, the reception part 61 on the connection sleeve 22.

Thus, the coupling device 10 in this folded position of course occupies a much more restricted longitudinal space than it occupies in its deployed position, and also a more restricted space with respect to the rigid coupling device according to the prior art.

Consequently, the flexible undersea pipeline and the coupling device 10 according to the invention will be able to be installed from a surface vessel in a single operation and via the conventional means for unwinding the pipeline. In particular, the folded coupling device 10 may be driven through an installation well formed in the surface vessel.

We thus find in FIG. 3, a surface vessel 68 floating on the surface and in the vicinity of which the float 14 is also floating. The rising part 16 of the flexible undersea pipeline 12 is initially stored and wound on the surface vessel 68, just like the coupling device 10, the connecting part 18 and the intermediate portion 20 which connects together the rising part 16 and the connecting part 18. Thus, during the installation of the undersea pipeline, the coupling device 10 is hung on the rising part 16 which is initially wound on the surface vessel 68, and first of all the connecting part 18 and the coupling device 10 are submerged below the surface in a vertical orientation. The coupling device 10 is then in a completely identical position to that which it has in detail in FIG. 2. Thus, the load of the coupling device 10 and of the connecting part 18 is wholly taken up by the rising part 16 at the connection sleeve 22. In this position, the coupling member 38 and the end 42 of the float 14 are coupled together by the line 40.

From this position illustrated in FIG. 3, a first length of the rising part 16 is unwound in the direction of the arrow D as the float 14 is moved away in a direction E from the surface vessel 68 up to a given distance. When the rising pipeline part is termed "rigid", it nevertheless has a certain degree of flexibility which enables it to be wound and unwound from the surface vessel. However, the minimum radius of curvature of a rigid pipeline is greater than that of a flexible pipeline, with the result that the unwinding device, on the surface vessel, must be adapted and in particular inclined with respect to the surface.

Again we find the coupling device 10 in FIG. 4, after the float 14, has been moved away from the surface vessel 68 and the first length has been unwound. The line 40 and the first length of the rising part 16 maintained under load via the first longitudinal part 24 of the coupling device 10 are then extended in the form of a catenary. Thus, with respect to the coupling device 10 illustrated in FIG. 2, the line 40 via the float 14 has exerted a lateral traction T on the second spacer 30, whereas the first spacer 32 is retained by the rising part 16 which extends in a substantially horizontal manner at the connection sleeve 22. Consequently, the first longitudinal part 24 has been driven to pivot and extends substantially horizontally likewise, whereas the flexible links 56, 54 of the second part 25 are extended longitudinally. In this way, the intermediate portion 20 is curved since the connection part 18 has maintained its initial vertical position. Moreover, since the first spacer 32 has moved toward the ring 44 which delimits the intermediate portion 20 of the connection part 18, the telescopic arms 58, 60 have been retracted.

Subsequently, as the rising part 16 is unwound, it exerts not only a force directed toward the seabed which is increasingly large on the second spacer 32, but also it extends at the connection sleeve 22 in an increasingly vertical direction. We thus find in FIG. 5 an intermediate position in which the weight of the rising part 16 is taken up by the float 14 (not shown) via the first longitudinal part 24 of the coupling device 10 and the line 40. The tilting of the rising part 16 which takes place in a continuous and relatively slow manner as it is unwound tends in this way to cause the first longitudinal part 24 to pivot toward a vertical position. Furthermore, as the traction is taken up by the line 40 secured to the float 14, the telescopic arms 58, 60 retract into their maximum shortening positions and maintain the ring 44 and the second spacer 32 at a distance. Thus, the intermediate portion 20 curves in a swan's neck. It is preserved from folding, which would damage it, by virtue of the vertebra sheath 46, but even more surely by virtue of the telescopic arms 58, 60 which maintain the second spacer 32 and the ring 44 at a distance.

While continuing the installation of the undersea pipeline, as represented in FIG. 6, the float 14 takes up all of the load of the rising part 16 which then extends substantially vertically. We then find the coupling device 10 in a position analogous to that which it has in FIG. 1. Furthermore, the intermediate portion 20 is maintained curved in a swan's neck by virtue of the second part 25 of the coupling device 10 and the locking arms 58, 60. Moreover, the connecting portion 18 hangs substantially parallel to the rising portion 16 and will be able to recover so as to be connected at the surface to a storage installation while being extended in the form of a catenary.

According to a particular mode of installing the flexible pipeline, represented in FIG. 7 and in a phase prior to that illustrated in FIG. 3, the connecting part 18 and the intermediate portion 20, which form a single pipe part as explained above, are prewound on one side of the surface installation 68, for example, on a first reel 70, whereas the rising pipeline part 16 is wound on another side on a second reel 72. Moreover, the coupling device 10 is installed on the connecting part 18 and is suspended there. Furthermore, the connection sleeve 22 which is initially free from the rising pipeline 16 is connected to a traction line 74 which is extended in a loop below the surface vessel 68 so as to return from the side from which the rising part 16 is wound on the surface vessel 68 and in particular in the region of the second reel 72. The connecting part 18 is then unwound toward the seabed, while the traction line 74 is wound on the surface vessel 68 in order to drive the coupling device 10 below the surface vessel 68 and in order to bring it back up there in the region of the second reel 72 on which the rising part 16 is wound. The coupling device 10 is then connected to the rising part 16 and therefore to the intermediate portion 20, whereas the connecting part 18 is released from said one side of the surface installation 68. We then find again the elements of the installation in the state in which they are found as illustrated in FIG. 3.

The invention claimed is:

1. A method of installing a tubular undersea pipeline for transporting hydrocarbons between a seabed and a surface, wherein the undersea pipeline has a rising part extending below, a surface connecting part and an intermediate portion between the rising part and the connecting part;

the method comprising
floating a float in the vicinity of the surface and coupling together the rising part and the connecting part in suspension in a manner to maintain the intermediate portion curved in a swan's neck shape between the rising part and the connecting part:
storing the tubular undersea pipeline on a vessel floating on the surface;
providing a deformable coupling device which connects together the rising part and the connecting part substantially parallel to the intermediate portion, the coupling device comprising a first longitudinal part and a second part, and connecting the first and second parts in a coupling region of the first part by a pivoting link;
connecting the float and the coupling region of the first longitudinal part while hanging the intermediate portion and the coupling device from the rising part, and while they are hanging, submerging them; and
unwinding the rising part toward the seabed such that the connecting part is retained by the float via the second part, such that the rising part tilts toward the seabed by driving the first part in a pivoting motion about the coupling region while curving the intermediate portion, and retaining the rising part suspended from the float via the first part.

2. The installation method as claimed in claim 1, further comprising maintaining the two parts of the coupling device inclined with respect to one another in a fixed position in order to maintain the intermediate portion curved along a radius of curvature greater than a limit radius of curvature.

3. The installation method as claimed in claim 1, wherein the intermediate portion is comprised of segments, and such that pivoting of the segments with respect to one another is limited so as to limit the radius of curvature of the intermediate portion.

4. The installation method as claimed in claim 1, further comprising storing the connecting part that is connected to the intermediate portion on one side of the surface vessel and storing the free rising part on another side of the vessel.

5. The installation method as claimed in claim 4, further comprising
coupling the intermediate portion and the first longitudinal part together to a traction line, while coupling the second part and the intermediate portion together and suspending them from the connecting part;
unwinding the connecting part from the one side of the vessel while winding up the traction line from the other side of the vessel, thereby forming a loop below the surface vessel so as to connect the intermediate portion and the first longitudinal part coupled together to the rising part, on the surface vessel.

6. The installation method as claimed in claim 1, further comprising separating the float from the surface vessel after connecting the float to the coupling region of the first longitudinal part and submerging the intermediate portion and the deformable coupling device, so as to extend the rising part and the first part in the form of a catenary.

7. The installation method as claimed in claim 1, further comprising drawing the rising part toward the seabed after having unwound the rising part, so as to drive the float below the surface in order to align and maintain substantially vertically in tension the rising part and the first part.

8. An undersea installation for transporting hydrocarbons between a seabed and a surface, comprising
a tubular undersea pipeline,
a float configured to float in a vicinity of the surface, and a coupling device for coupling the pipeline to the float;
the tubular undersea pipeline having a rising part, a surface connecting part and an intermediate portion between the rising part and the connecting part, the coupling device configured to couple together the rising part and the connecting part in suspension and to maintain the intermediate portion curved in a swan's neck shape between the rising part and the connecting part;
the coupling device comprises a first longitudinal part and a second part connected in a coupling region of the first part by a pivoting link, so as to connect together the rising part and the connecting part substantially parallel to the intermediate portion, the coupling region of the first longitudinal part and the float being configured to be connected together;
the first part being configured to pivot about the coupling region while curving the intermediate portion when the rising part is unwound and tilts toward the seabed, the connecting part being retained by the float via the second part and the rising part is retained suspended from the float via the first part.

9. The undersea installation as claimed in claim 8, wherein the first longitudinal part comprises two substantially parallel uprights and two mutually opposed spacers configured for maintaining the uprights spaced from one another, a first one of the spacers being configured to receive the rising part and a second one of the spacers defining the coupling region, and the intermediate part is configured to extend freely between the uprights.

10. The undersea installation as claimed in claim 9, wherein the second part comprises two flexible links mounted on the second spacer respectively in line with the uprights.

11. The undersea installation as claimed in claim 10, wherein the second part additionally comprises a retaining ring configured to receive the connecting part, the retaining ring having two projecting diametrically opposed half-shafts, and the two flexible links respectively being connected to the two half-shafts.

12. The undersea installation as claimed in claim 8, wherein the coupling device additionally comprises a locking arm for maintaining the two parts of the coupling device inclined with respect to one another in a fixed position in order to maintain the intermediate portion curved along a radius of curvature greater than a limit radius of curvature.

13. The undersea installation as claimed in claim 12, wherein the locking arm is telescopic, and it is configured to run alongside the extended intermediate portion, in a drawn position.

14. The undersea installation as claimed in claim 8, wherein the intermediate portion is housed inside a vertebra sheath configured so as to limit the radius of curvature of the intermediate portion.

* * * * *